United States Patent
Kostov et al.

(10) Patent No.: US 9,977,143 B2
(45) Date of Patent: May 22, 2018

(54) METHOD FOR ATTENUATING MULTIPLES

(71) Applicant: Schlumberger Technology Corporation, Sugar Land, TX (US)

(72) Inventors: Clement Kostov, Houston, TX (US); Jing Wu, Houston, TX (US); Debra M. Dishberger, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 231 days.

(21) Appl. No.: 14/846,693

(22) Filed: Sep. 4, 2015

(65) Prior Publication Data

US 2017/0068009 A1  Mar. 9, 2017

(51) Int. Cl.
G01V 1/00 (2006.01)
G01V 1/36 (2006.01)

(52) U.S. Cl.
CPC ........ *G01V 1/364* (2013.01); *G01V 2210/324* (2013.01); *G01V 2210/56* (2013.01)

(58) Field of Classification Search
None
See application file for complete search history.

(56) References Cited

U.S. PATENT DOCUMENTS

| 4,809,238 A * | 2/1989 | Bishop | G01V 1/364 367/45 |
| 5,757,723 A | 5/1998 | Weglein et al. | |
| 5,774,417 A * | 6/1998 | Corrigan | G01V 1/36 367/21 |
| 2009/0316527 A1* | 12/2009 | Stewart | G01V 1/364 367/24 |
| 2010/0246324 A1* | 9/2010 | Dragoset, Jr. | G01V 1/36 367/24 |
| 2012/0041682 A1 | 2/2012 | Ramirez-Perez et al. | |
| 2013/0279290 A1* | 10/2013 | Poole | G01V 1/38 367/24 |
| 2014/0247969 A1* | 9/2014 | Srigiriraju | G01V 1/362 382/109 |

FOREIGN PATENT DOCUMENTS

WO  2013/116195 A1  8/2013

OTHER PUBLICATIONS

Coates, et al., "Internal multiple attenuation using inverse scattering: Results from prestack 1 & 2D acoustic and elastic synthetics," SEG Expanded Abstracts, 1996 pp. 1522-1525.

(Continued)

*Primary Examiner* — Cory Eskridge
(74) *Attorney, Agent, or Firm* — Michael Guthrie

(57) ABSTRACT

One embodiment of the present disclosure includes a method for processing seismic data comprising the steps of receiving data representing seismic energy gathered from a formation by a plurality of seismic receivers, wherein the data include primary and multiple data. A copy of the received data is created and compensated to reduce amplitude attenuation effects due to transmission and absorption losses. A multiple prediction algorithm is applied to the received and compensated data to obtain a multiple data prediction. The multiple data prediction is subtracted from the received data to obtain primary data. The primary data is processed to reduce attenuation effects in the received data.

18 Claims, 7 Drawing Sheets

(56) References Cited

OTHER PUBLICATIONS

Dragoset, "Challenges in Data-Driven Multiple Prediction and Attenuation," Presented at KOC-SEG Research Workshop in Kuwait City, Kuwait, Dec. 2014.
Jakubowicz, "Wave equation prediction and removal of interbed multiples," SEG Expanded Abstracts, 1998, pp. 1527-1530.
Melo, et al., "Cascaded internal multiple attenuation with inverse scattering series: Western Canada case study," SEG Denver 2014 Annual Meeting, pp. 4113-4117.
Ramirez, et al., "Green's theorem as a comprehensive framework for data reconstruction, regularization, wavefield separation, seismic interferometry, and wavelet estimation: A tutorial," Geophysics, vol. 74, No. 6, Nov-Dec. 2009, pp. W35-W62.
ten Kroode, "Prediction of Internal multiples," Wave Motion, 2002, vol. 35, Issue 4, pp. 315-338.
Wang, et al., "3D Inverse Scattering Series Method for Internal Multiple Attenuation," EAGE Expanded Abstracts, 2014, pp. E102-06.
Weglein, et al., "An inverse-scattering series method for attenuating multiples in seismic reflection data," Geophysics, vol. 62, 1997, pp. 1975-1989.
Weglein, et al., "Inverse scattering series and seismic exploration," Inverse Problems, 19, 2003, pp. R27-R83.
Wu, et al., "Elastic Green's theorem preprocessing for on-shore internal multiple attenuation: theory and initial synthetic data tests," SEG Denver 2014 Annual Meeting, pp. 4299-4304.
Wu, et al., "Robust internal multiple prediction algorithm," SEG Technical Program Expanded Abstracts, SEG San Antonio 2011 Annual Meeting, pp. 3541-3545.
Wu, et al., "The First Test and Evaluation of the Inverse Scattering Series Internal Multiple Attenuation Algorithm for an Attenuating Medium," SEG Denver 2014 Annual Meeting, pp. 4130-4134.
Zuo, et al., "An Internal-Multiple Elimination Algorithm for All Reflectors for 1D Earth Part I: Strengths and Limitations," Journal of Seismic Exploration, 23, pp. 393-404, 2014.
International Search Report and Written Opinion for the equivalent International patent application PCT/US2015/048909 dated May 13, 2016.
International Preliminary Report on Patentability for the equivalent International patent application for PCT/US2015/048909 dated Mar. 15, 2016.
International Preliminary Report on Patentability for the equivalent International patent application for PCT/US2015/048909 dated Mar. 15, 2018.

\* cited by examiner

METHOD FOR ATTENUATING MULTIPLES

BACKGROUND

The present disclosure generally relates to a method of improving Seismic data by reducing the effects of multiple reflected energy. Seismic exploration involves surveying subterranean geological formations for hydrocarbon deposits. A survey typically involves deploying seismic source(s) and seismic sensors at substantially predetermined locations. The sources generate seismic waves which propagate into the geological formations creating pressure changes and vibrations along their way. Changes in elastic properties of the geological formation scatter the seismic waves, changing the properties of the seismic waves. For example, the direction of propagation of the seismic wave may be altered. Part of the energy emitted by the sources are reflected from interfaces between subterranean formations. Some of the reflected waves reach the seismic sensors, which detect seismic waves. There are various types of seismic sensors. Some are sensitive to pressure changes (hydrophones) and others are sensitive to particle motion (geophones). Industrial surveys may deploy either one type of sensor or both types. In response to the detected waves, the sensors generate electrical signals to produce seismic data. Analysis of the seismic data (or traces), the shape, position, and composition of the subterranean formations can be determined and can then be indicative of the presence or lack thereof of probable locations of hydrocarbon deposits Some surveys are known as "marine" surveys because they are conducted in marine environments. However, "marine" surveys may be conducted not only in saltwater environments, but also in fresh and brackish waters. In a first type of marine survey called a "towed-array" survey, an array of streamers and sources is towed behind a survey vessel. In a second type of marine survey, an array of seismic cables, each of which includes multiple sensors, laid on the ocean floor, or sea bottom; and a source is towed behind a survey vessel.

Oftentimes, seismic waves reflect from interfaces other than just those between subterranean formation, as would be desired. Seismic waves sometimes reflect from the water bottom and the water surface, and the resulting reflected waves themselves continue to generate further reflections. Waves that reflect multiple times are referred to as multiple reflections or "multiples". Surface multiples are those waves that have reflected multiple times between the water surface and any upward reflectors, such as the water bottom or formation interfaces, before being senses by a receiver. Generally, surface multiples are considered undesirable noises that interfere with and complicate the desired data.

Considerable effort is expended in the design of seismic data acquisition and the processing of seismic data to limit the effect of multiple reflections on seismic data. Nevertheless, in many instances, present methods of processing seismic data are not as efficient as they could be. Accordingly, a need exists for an efficient method for attenuating seismic data multiples.

SUMMARY

In one embodiment of the present disclosure a method for processing seismic data includes the steps of receiving data representing seismic energy gathered from a formation by a plurality of seismic receivers, wherein the data include primary and multiple data and creating a copy of the received data. The method further includes the steps of compensating the copied data to reduce attenuation effects and applying a multiple prediction algorithm to the received and compensated copied data to identify the multiple data. Further, the method includes the steps of subtracting the multiple data from the received data and obtain the primary data and processing the primary data in the received data to reduce attenuation effects in the received data.

In another embodiment of the present disclosure, a system for processing data includes a processor and a computer memory comprising instructions executable by the processor to receive data representing seismic energy gathered from a formation, wherein the data include primary and multiple data. The instructions further cause the computer to create a copy of the received data, compensate the copied data to reduce attenuation effects and apply a multiple prediction algorithm to the received and compensated signals to identify the multiple data. In addition, the computer subtracts the multiple data from the received data to identify the primary data and processes the primary data to reduce attenuation effects.

In yet another embodiment of the present disclosure, a non-transitory computer-readable medium having instructions stored thereon, that when executed by a processor, performs the steps of receiving data representing seismic energy gathered from a formation from a plurality of seismic receivers, wherein the data include primary and multiple data and creating a copy of the received data. The processor compensates the copied data to reduce attenuation effects and applies a multiple prediction algorithm to the received and copied data to identify the multiple data. Further the processor subtracts the multiple data from the received signals to identify the primary data and processes the primary data to reduce attenuation effects. The processor also generates a model of the formation based in part on the processed primary data.

Other or additional features will be apparent from the following description, from the drawings, and from the claims. The summary is provided to introduce a selection of concepts that are further described below in the detailed description. The summary is not to be intended to be used as an aid in limiting the scope of the claimed subject matter.

DETAILED DESCRIPTION

Figure 1:
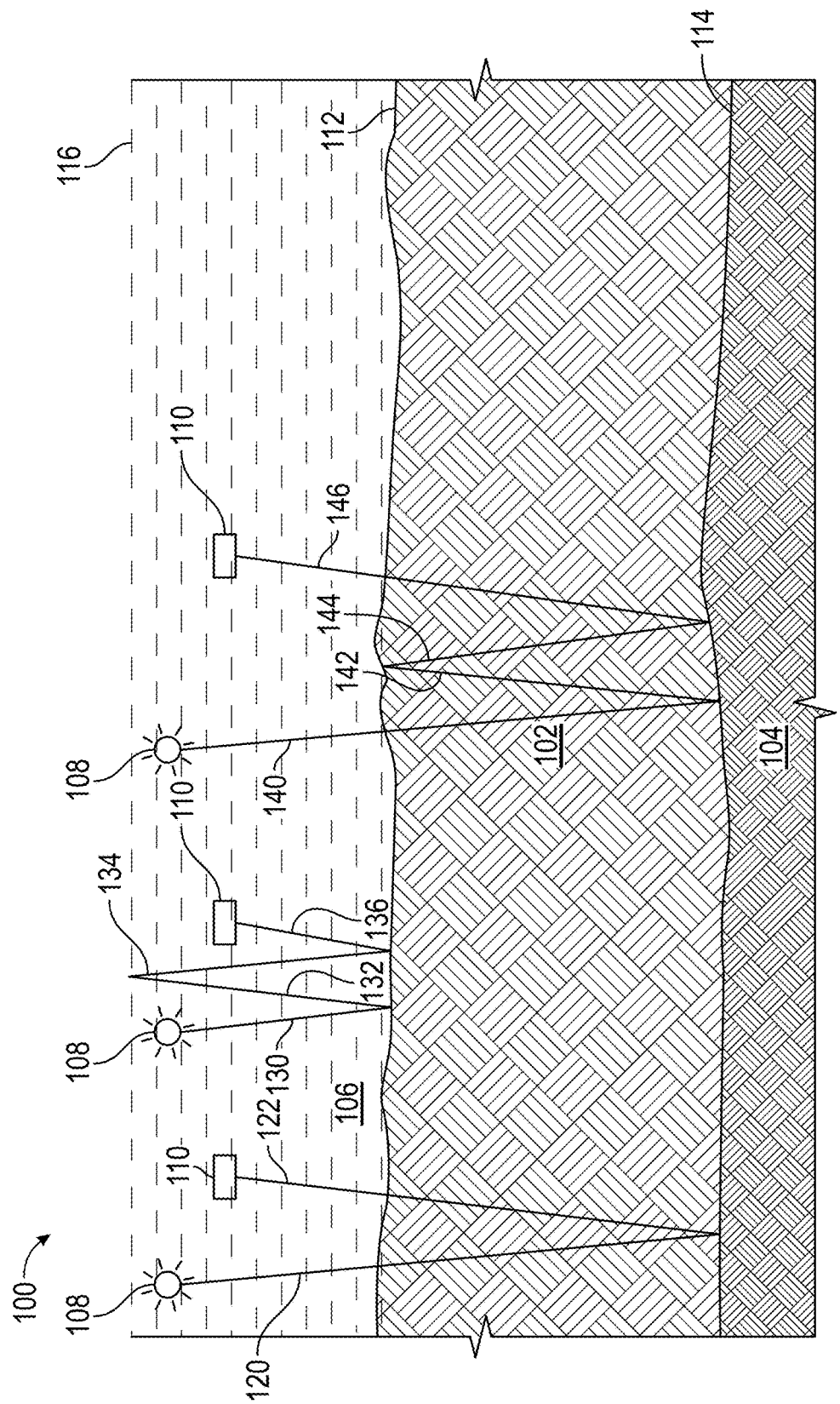
FIG. 1 depicts a schematic view of marine seismic surveying deployed for acquiring seismic data.

Turning now to FIG. 1, a schematic view of marine seismic survey 100 is shown. Subterranean formations 102, 104 targeted for exploration, are below a water body 106. Seismic energy sources 108 and seismic receivers 110 are positioned in the body of water 106, typically by one or more seismic vessels (not shown). A seismic source 108, for example, an air gun, if fired to create seismic waves in the body of water 106. A portion of the seismic waves travels through the body of water 106 in the direction of the subterranean formation 102, 104 underneath the water. When the seismic waves encounters a seismic reflector, a portion of the seismic waves is reflected upward and a portion of the seismic wave continues to propagate downward. A reflector is caused by changes in the earth parameters (e.g., density or velocity) of the subterranean structure. The seismic reflector could be the water bottom 112 or one of the interfaces between the subterranean formation 102, 104, such as interface 114 between formations 102 and 104. When the reflected waves travelling upward reach the water/air interface at the water surface 116, a portion of the waves are again reflected downwards. Continuing in this manner, seismic waves can reflect multiple times between upward reflectors, such as the water bottom or formation interface 114, and the downward reflector at the water surface 116, as described further below. Each time the reflected waves propagate past the position of a seismic receiver 110, the receiver senses the reflected waves and generated representative signals (or datapoints).

Those seismic waves that have reflected from the water bottom 112 or an interface between subterranean formations only once before being recorded by a seismic receiver are considered primary reflections. FIG. 1 illustrates an example of a primary reflection shown by raypaths 120 and 122. These primary reflections are typically indicative of the desired information about the subterranean formation. On the other hand, those waves that have reflected more than once in the subsurface prior to being sensed by a receiver 110 are considered multiple reflections ("multiples"). An example of a free-surface multiple with downward reflection at the free surface (air-water interface, 116) and which is also a water bottom (112) multiple is illustrated by raypaths 130, 132, 134, and 136. Examples of interbed multiple are shown by raypaths 140, 142, 144, and 146. Interbed multiples reflect downward on interfaces that are deeper than the free surface. Although individual interbed multiples may have lower amplitudes than free-surface multiples with similar upward reflections, the combination of interbed multiples from many downward generators may have a significant effect on the seismic data. As previously mentioned, all such multiples are extraneous noise that obscures the desired primary reflection signal.

We now consider methods that predict interbed multiples. Such methods include approaches based on the Inverse Scattering Series (Weglein et al., 2003), as well as related methods by Jakubowicz (1998), Ten Kroede (2002), Wu et al. (2011), Ramirez et al. (2012). It is recognized that such methods provide accurate predictions of the traveltimes (kinematics) of the multiples in the data within a specified range of conditions, but have theoretical limitations that lead to systematic under-estimation of the amplitudes of the predicted multiples (Ramirez and Weglein, 2008; Dragoset, 2014). Recently, Wu and Weglein (2014) have analyzed the amplitudes of the predicted multiples (for 1D media and normal incidence plane waves) and pointed out two factors that affect these amplitudes; a first factor is related to transmission losses, while a second factor is related to anelastic losses in absorptive media.

Those of skill in the art are typically familiar with the work of Wu and Weglein (2014, 2015), to derive a method to predict interbed multiples for layered media and vertically propagating waves, using the Inverse Scattering Series (ISS) method. This ISS method is further described in U.S. Pat. No. 5,757,723, which is hereby incorporated by reference in its entirety. One example of a software implementation based on the ISS method is the Omega™ Seismic Functional Module (SFM) known as Inverse-Scattering Internal Multiple Prediction algorithm, (ISIMP). Another Omega™ SFM is XIMP (eXtended Interbed Multiples Prediction), which is based on related concepts to ISS, but provides models for subsets of internal multiples, related to particular multiples generators, defined as horizons or layers (Wu et al., 2011; Ramirez et al., 2012).

In one embodiment of the ISIMP implementation, the equation for prediction of interbed multiples ($b_3(k_z)$) by the above method may be of the form:

$$b_3(k_z) = \int_{-\infty}^{\infty} b_1(z)e^{ik_z z}dz \int_{-\infty}^{z-\epsilon} b_1(z_1)e^{-ik_z z_1}dz_1 \int_{z_1+\epsilon}^{\infty} b_1(z_2)e^{ik_z z_2}dz_2. \quad (1)$$

For an incident plane wave at normal (vertical) incidence, with a spike wavelet, the recorded data $D(t)$ are transformed to Fourier domain $D(\omega)$, defining $$b_1\left(\frac{2\omega}{c_0}\right) = D(\omega),$$

and $$b_1(z) = \int_{-\infty}^{\infty} b_1(k_z)e^{-ik_z z}dk_z, \text{ with}$$

$k_z = 2\omega/c_0$ being the vertical wavenumber, and
$b_1(z)$ corresponding to an uncollapsed FK migration of the input data (normal-incident spike plane-wave data in this example). The term $\epsilon$ in the formula is used to make sure the events satisfy the lower-higher-lower relationship, and its value is chosen on the basis of the wavelength corresponding to the wavelet.

Figure 3:
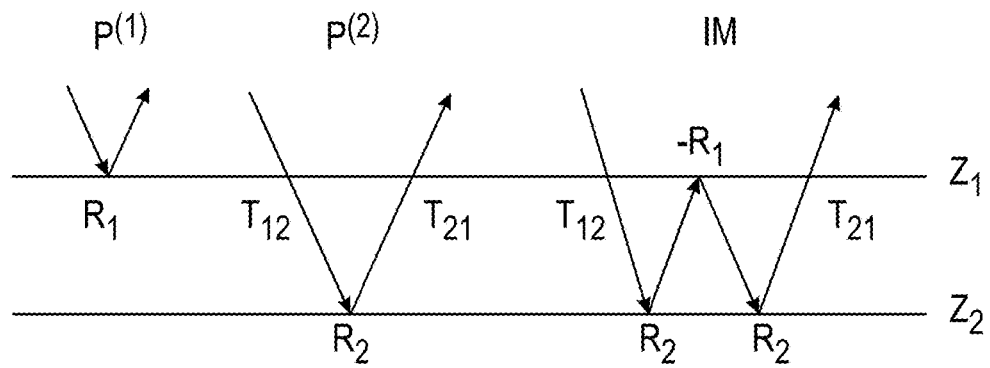
FIGS. 3 and 3A illustrate reflector models showing primary and multiple events that may be acquired by the equipment shown in FIG. 1.

Turning now to FIG. 3, a two-reflector model is illustrated where $P^{(1)}$ and $P^{(2)}$ are primaries; $R_1$ and $R_2$ are reflection coefficients; $T_{12}$ and $T_{21}$ are transmission coefficients. IM is the first order internal multiple. The two-reflector model of FIG. 3 assumes the depths of the source and the receiver to be zero.

Substituting the analytic form of data into equation (1), the prediction result is illustrated below in equation (2), $$b_3(k_z) = -T_{12}T_{21}\frac{R_1^*}{R_1}e^{-2\alpha_1}IM(k_z). \quad (2)$$

The expression $IM(k_z)$ represents the internal multiples in the data. The term $$-T_{12}T_{21}\frac{R_1^*}{R_1}$$

is defined as a transmission factor (TF), and the term $e^{-2\alpha_1}$ is the Q absorption factor (QF). Accordingly, those of ordinary skill in the art will recognize that equation (2) can be rewritten as follows:

$$\frac{b_3(k_z)}{IM(k_z)} = TF * QF.$$

It is contemplated that both expressions TF and QF typically have more complex forms in situations where there are more than two reflectors existing in a given earth model. TF is related to the transmission losses at the interfaces on and above a multiple generator; Ramirez and Weglein (2008, equation 3) provide the expression for the transmission factor in the case of overburden with J layers (where J equal or larger than 1). The expression for the transmission factor TF for cases where the overburden includes 1 or more layers is as follows:

$$\begin{cases} T_{01}T_{10} & \text{for } j=1 \\ \prod_{i=1}^{j-1}(T_{i\,i-1}^2 T_{i-1\,i}^2)T_{j\,j-1}T_{j-1\,j} & \text{for } 1<j<J \end{cases} \quad (3)$$

Note that when J is equal or larger than 2, the transmission factor for each interface above the multiple generator are squared, thereby compensating for transmission losses for two round-trips through the overburden.

The factor QF is related to the Q absorption or generalized transmission loss in the layers above the multiple generator. A plane wave of frequency $\omega$ travelling a distance x in a medium of constant Q factor and velocity c has its amplitude decreased by a factor of $$A(x,Q) = e^{\frac{-i|\omega|x}{2cQ}}.$$

The compensation for absorption losses for a wave travelling from the measurement surface to the generator of multiples $P^{(1)}$ is given by the factor $e^{-\alpha^1}$. Thus, the transmission TF factor is the square of factor for absorption attenuation in the overburden.

Figure 3A:
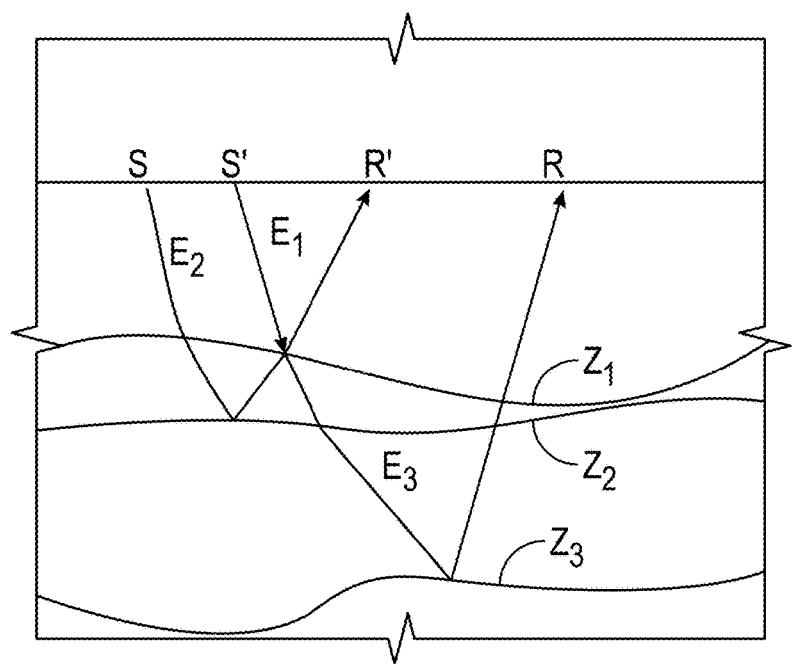

Referring to the definitions of attenuation (Wu and Weglein, 2014), it is established that the $e^{-2\alpha^1}$ term in equation (2) above compensates for attenuation accumulated in two round trips through the overburden (layers above the generator for the internal multiples), similar to the situation described above for the transmission losses. With reference to FIG. 3A, it is contemplated that compensation for attenuation in the overburden may be necessary for two round trips through the overburden, in the case of normal incidence wave propagation as analyzed theoretically, as well as in a more general case (for example, 3D media and/or point sources) An internal multiple is shown by the raypath from source S to receiver R, with a downward reflection on an interface $Z_1$. Events $E_1$, $E_2$, and $E_3$ contribute to the prediction of the internal multiple. Event $E_1$ is the raypath from S' to R' with an upward reflection on the interface $Z_1$, event $E_2$ is the raypath from S to R' with an upward reflection on an interface $Z_2$, and event $E_3$ is the raypath from S' to R with an upward reflection on an interface $Z_3$. The interface $Z_1$ where downward reflections occur may be an interpreted horizon provided by the user, or it may be a horizon set at a constant time (or depth, or pseudo depth) or interpolated between interpreted horizons. In the ISIMP implementation, each constant depth level is considered a potential interface generating downward reflection. The events E2 and E3 can be concatenated together by convolution and the event E1 can be removed by cross-correlation to derive an event that occurs at traveltime $T=T_3+T_2-T_1$.

The extent of attenuation experienced by a seismic event depends on the raypath for that event. For the internal multiple in FIG. 3A, the raypath length L is equal to $L_2+L_3-L_1$. However, for the multiple predicted by equation (1) the attenuation (transmission as well as absorption) is cumulated along raypaths of events $E_1$, $E_2$, and $E_3$, with combined length of $L_2+L_3+L_1$. The difference between these lengths (combined length of events $E_1$, $E_2$, and $E_3$ minus the length L of the internal multiple) is $2L_1$. This difference in lengths explains the underprediction of the amplitudes of interbed multiples by a factor corresponding to amplitude attenuation during two round trips through the overburden.

Another embodiment of the present disclosure contemplates reducing the effect of TF and QF on amplitude prediction. Unlike the ISIMP formula shown in equation 1, this embodiment of the present disclosure uses two different datasets as inputs for multiple prediction. For example, the modified inverse scattering series (ISS) (as described in Weglein (2003)) internal multiple attenuation algorithm may be expressed as:

$$b_3(k_z) = \int_{-\infty}^{\infty} b_1(z)e^{ik_z z}dz \int_{-\infty}^{z-\epsilon} c_1(z_1)e^{-ik_z z_1}dz_1 \int_{z_1+\epsilon}^{\infty} b_1(z_2) e^{ik_z z_2} dz_2, \quad (4)$$

where the term $c_1(z)$ is computed from modified data $\tilde{d}(t)$ via the same transform applied to compute $b_1(z)$ from original data $d(t)$;

a) when $\tilde{d}(t)=d(t)$, equation (4) provides a similar prediction as equation (2);
b) when $\tilde{d}(t)$ is equal to primaries in an overburden section, the predicted multiples are less affected by spurious events (events in the interbed multiples model that are not in the data), as noted in Melo et al. (2014) for the cascaded application of interbed multiples prediction using the ISIMP implementation, and variations on the ISS concepts.
c) Consider d(t) to be input data or estimated primaries to which amplitude corrections have been applied as the inverse of the factors TF and QF, such that the predicted multiples by equation (4) match the input data.

To compensate for QF, the present disclosure contemplates applying twice Q compensation using the estimated Q model, or alternatively applying Q compensation once with a Q/2 model. The Q model may be estimated from analysis of VSP data at well locations and interpolation between wells, or by Q tomography from surface seismic data, or by a combination of both approaches. To compensate for amplitude compensation for transmission through the overburden may be applied twice. A model for transmission losses may also be obtained from well logs or from VSP data, or from acoustic impedances estimated from surface seismic data by inversion. In the application described above we apply amplitude correction to seismic data before computations of the multiples models according to equation (2) and to the flowchart shown in and described with respect to FIG. 2B. By applying the above described, process, compensation for amplitude losses in the medium above specified generators is achieved, thus making the models of multiples not only comparable to the data, but also more consistent and comparable to each other.

Another embodiment contemplates using the result of equation (2) to equalize the amplitudes of models of different subsets of interbed multiples. For example, using the XIMP approach (Wu et al., 2011) two interbed multiples models may be computed, for horizon generators $Z_1$ and $Z_2$, respectively (FIG. 3A). These models may require compensation with different correction factors, as shown in equation (2). The amplitude correction factors for both models depends on at least medium properties between the two horizon generators. Once the amplitude correction factors are derived, the ratios of the amplitude correction factors can be used to compensate amplitude losses for the interface at a larger depth ($Z_2$ interface), such that now both models require a similar correction when matched to the data. One advantage of this approach is that it doesn't require knowledge of material properties up to the measurement surface, but can be readily used with log or VSP data available only over a limited depth interval.

Numerical tests for waves emitted from a point source in a layered medium provide justification (as discussed with reference to FIGS. 4 and 5 below) for applying the method disclosed herein beyond the conditions set for theoretical analysis. The methods disclosed herein may also be applied for media that are not layered media.

Note that the present disclosure differs from the disclosure of Zou and Weglein (2014) where an approach to correct iteratively for the transmission losses and estimating the transmission losses from the data as part of their multiples elimination procedure is disclosed. Further the Zou and Weglein (2015) approach is directed to non-absorptive media. One or more implementations of various techniques for removing internal multiples from seismic data according to the principles and equations described above will now be described in more detail with reference to the figures in the following paragraphs.

Figure 2A:
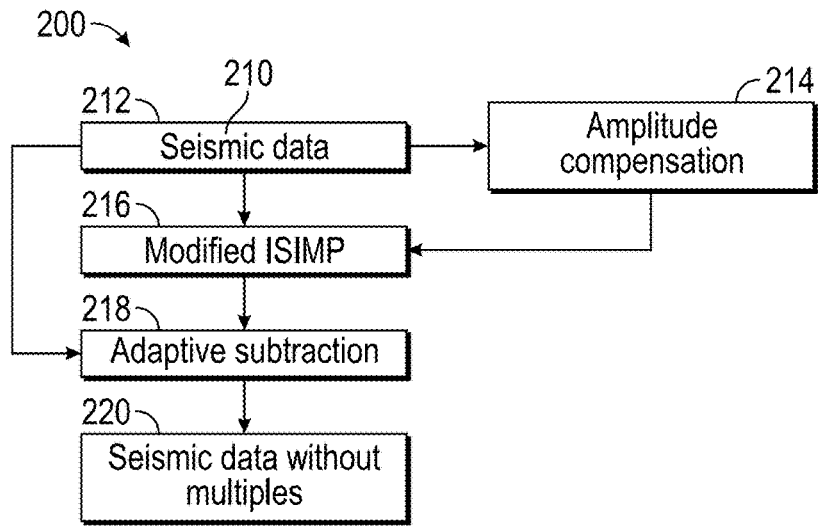
FIGS. 2A-2D illustrate flow charts of various embodiments of methods of according to various embodiments of the present disclosure.

FIG. 2A illustrates one embodiment of a method 200 for attenuating or removing multiple data representing signals recorded in a seismic survey in accordance with implementations of various techniques described herein. In one implementation, seismic data 210 is loaded onto a computer system (described below in connection with FIG. 7) at a block 212. The seismic data 210 may include primary reflections and internal multiple reflections as described above with respect to FIG. 1. A block 214 applies amplitude compensation to the seismic data 210. As is known to those of ordinary skill in the art, a model of attenuation factors (transmission losses or Q-attenuation) characterizing an area of interest may be derived from seismic survey data. In other embodiments, the Q-values may be modelled from well data such as vertical seismic profiles at well locations, interpolation between wells, Q-tomography, or from any combination of each of these methods. The prediction of interbed multiples including the use of a model for anelastic attenuation (Q model) is explained in greater detail below. Following the partial compensation by the block 214, the partially compensated seismic data is transmitted to a block 216 that applies an internal multiple attenuation algorithm to the partially compensated seismic data and a copy of the seismic data from the block 212 to derive an internal multiple estimate that models the internal multiples in the seismic data 210. The internal multiple attenuation algorithm implemented in the block 216 may include the ISIMP implementation or the modified ISS implementation discussed above.

Next, the estimated multiple model derived in the block 216 is adaptively subtracted from the seismic data 210 at a block 216 to derive seismic data that is substantially free of multiples in a block 220. Note that the seismic data 210 has not been corrected for absorption or transmission losses at this point during the processing.

Figure 2B:
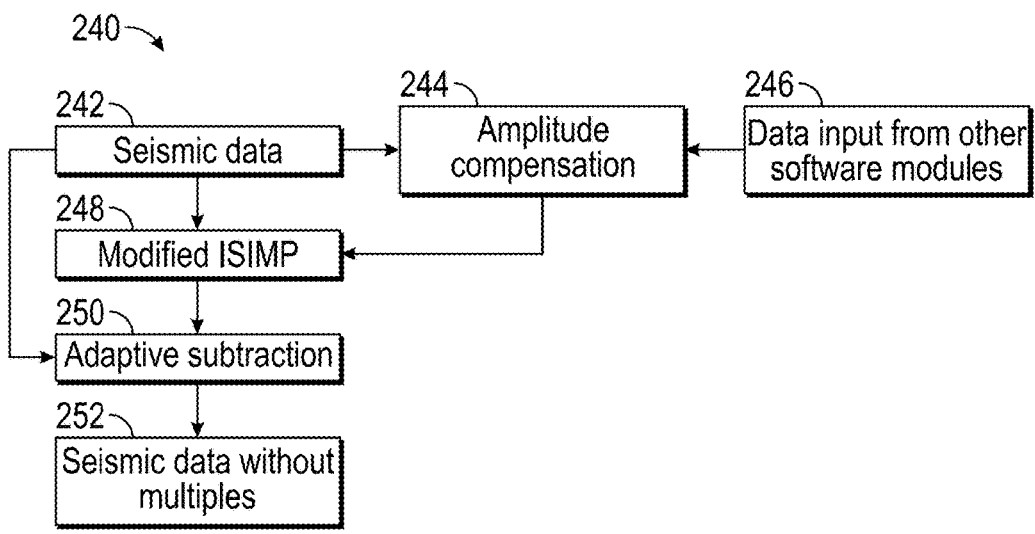

Turning now to FIG. 2B, another embodiment of a method 240 for attenuating multiples in seismic data is shown. A block 242 receives seismic data, then a copy of the seismic data is transmitted to a block 244. The block 244 performs amplitude compensation on the copy of the seismic data received from the block 242. In this embodiment of the method 240, the block 244 may receive a data input 246 from other software modules that estimate a Q model (e.g. Omega™ SFM Q-TOMO module). Such Q-models are used for instance by depth migrations that compensate for attenuation as part of the migration (Omega™ SFMs Q-RTM, Q-KDM). Following the block 244, control is passed to a block 248 that applies the modified ISS internal multiple attenuation algorithm to the seismic data received in the block 242 and the partially Q-compensated data from the block 244 to derive a model of the multiples in the seismic data. Next, a block 250 adaptively subtracts the multiples model from the seismic data from the block 242 to derive seismic data that is substantially free of multiples in a block 252.

Figure 2C:
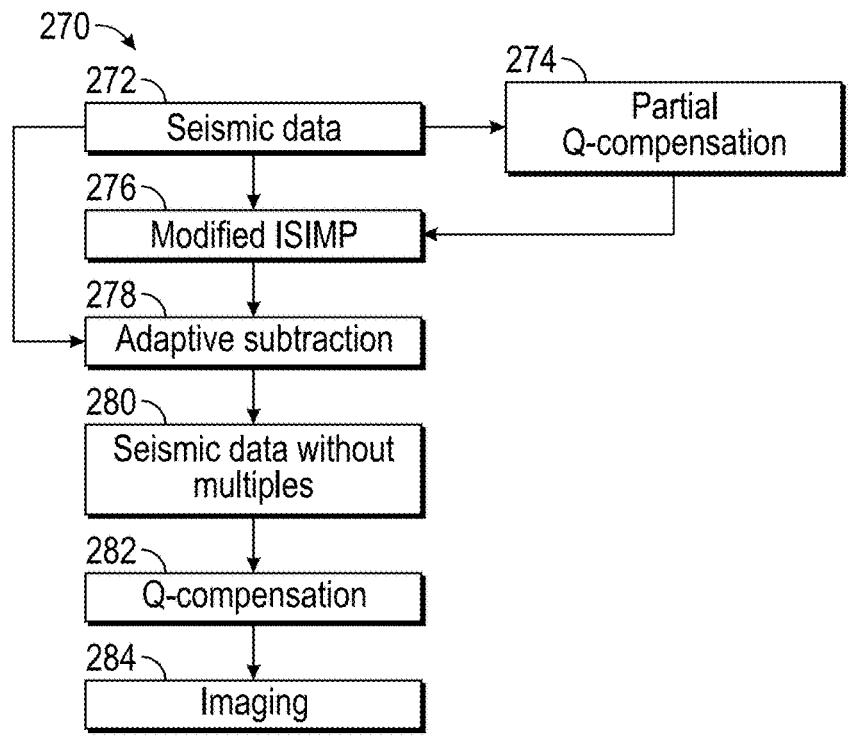

Yet another embodiment of a method 270 for attenuating multiples in seismic data is described in connection with FIG. 2C. A block 272 receives seismic data. A copy of the seismic data is transmitted to a block 274. The block 274 compensates the seismic data for any losses that may have occurred due to transmission or the Q-factor of the transmission medium. Following the block 274, control is passed to a block 276 that applies the modified ISS internal multiple attenuation algorithm to the seismic data received in the block 274 and the partially Q-compensated data from the block 274 to derive a model of the multiples in the seismic data. Next a block 278 adaptively subtracts the multiples from the seismic data from the block 272 to derive seismic data that is substantially free of multiples in a block 280. A block 282 applies additional Q-compensation to the seismic data derived in the block 280 to remediate any attenuation that may still be present in the seismic data and a block 284 renders an image of the subsurface region of interest using the compensated data from the block 284.

Figure 2D:
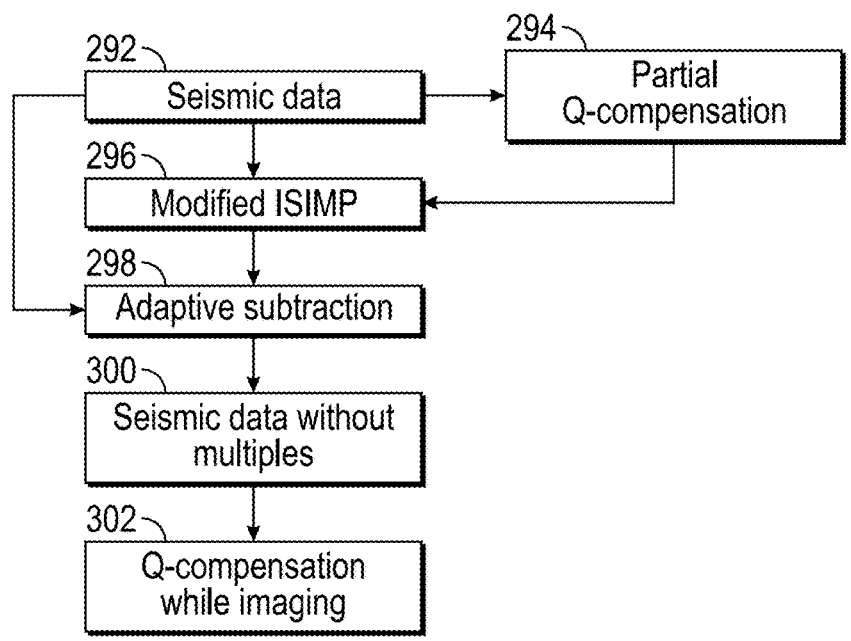

FIG. 2D illustrates another embodiment of a method 290 for attenuating multiples in seismic data. A block 292 receives seismic data. A copy of the seismic data is transmitted to a block 294. The block 294 compensates the seismic data to reduce the effect of any transmission losses that may have occurred to the data. Following the block 294, control is passed to a block 296 that applies the modified ISS internal multiple attenuation algorithm to the seismic data received in the block 274 and the partially Q-compensated data from the block 294 to derive a model of the multiples in the seismic data. Next a block 298 adaptively subtracts the multiples model from the seismic data from the block 292 to derive seismic data that is substantially free of multiples in a block 300. A block 302 applies additional Q-compensation to the seismic data derived in the block 300 while the subsurface region characterized by the seismic data is being imaged in a block 302. The Q-compensation in the block 302 remediates attenuation that may be present in the seismic data and renders an image of the subsurface region of interest.

Figures 4, 5:
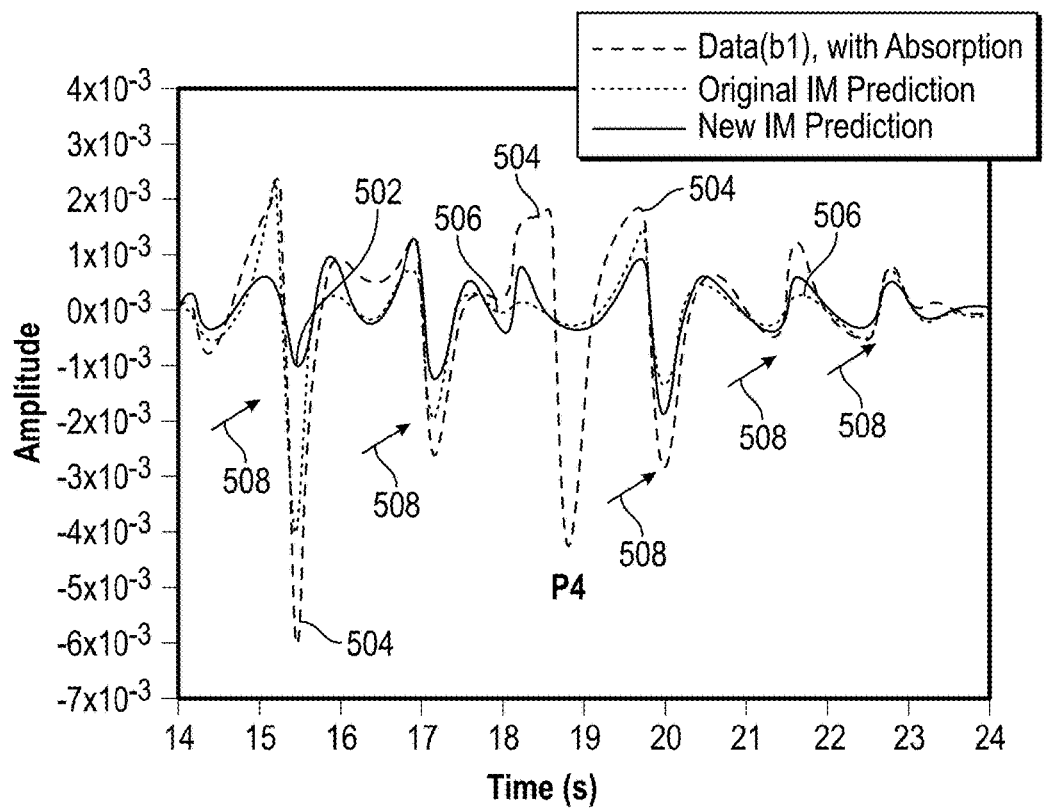
FIG. 4 depicts a five layer seismic model.
FIG. 5 illustrates results derived from implementing embodiments of the methods of FIGS. 2A-2D.

FIG. 5 shows results of an evaluation of one embodiment of the method of compensating Q-amplitude. A 1D normal incidence plane wave propagates in the acoustic, absorptive, horizontally layered medium with parameters shown in FIG. 4. Reflection data are received in the top layer of the model (medium 1). The received data is indicated by reference numeral 504. The multiple prediction 502 results from the application of one embodiment of the method disclosed herein. A result from a known method of predicting multiples is indicated by reference 506. The prior art method does not take into account absorption in the medium. By observing the areas marked 508 in FIG. 5, those of ordinary skill in the art will readily notice that the amplitude of the data derived from the subtraction of the multiples prediction 502 derived by the implementation of an embodiment of the present disclosure is significantly improved compared to the amplitude of the data derived by the prior art method indicated by 506 in FIG. 5. It is understood that the modified multiple prediction 502 still has a smaller amplitude than the original attenuated data indicated by 504 due to the transmission factor (TF) as discussed above.

Figure 6:
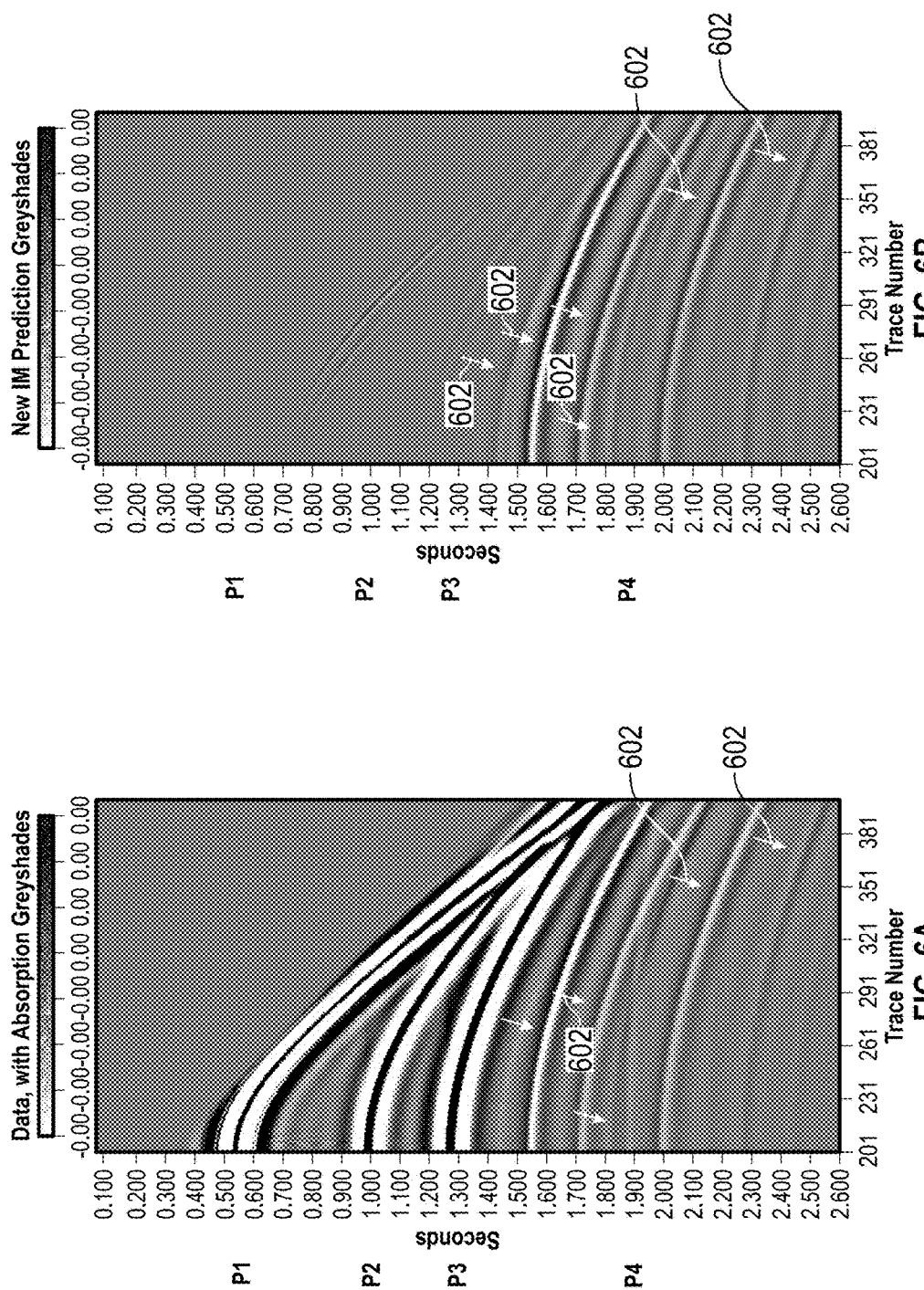
FIG. 6A shows a common shot gather of received seismic data as a function of offset and time.
FIG. 6B shows the common shot gather of FIG. 6A and the internal multiples predicted by the method of FIG. 2A.

Another example of an evaluation of one embodiment of the method disclosed herein is described with respect to FIGS. 6A and 6B using data with offset. The shot gather record is generated using a software Plane Wave transverse Isotropic Modelling (PWTIM) as is known to those of skill in the art. Parameters to produce a 1D earth shot gather with a point spike source are chosen and the Omega™ Seismic Function Module INV_Q_Filter is used to obtain this compensated dataset. The prediction results can be seen from FIGS. 6A and 6B, where P1-P4 represent four primary events generated at three interfaces and the arrows 602 represent internal multiples. Those of ordinary skill in the art will observe a similar improvement as the previous 1D example in FIG. 5. Specifically, the internal multiple prediction in FIG. 6B shows relatively high accuracy in comparison to the input data shown in FIG. 6A

Figure 7:
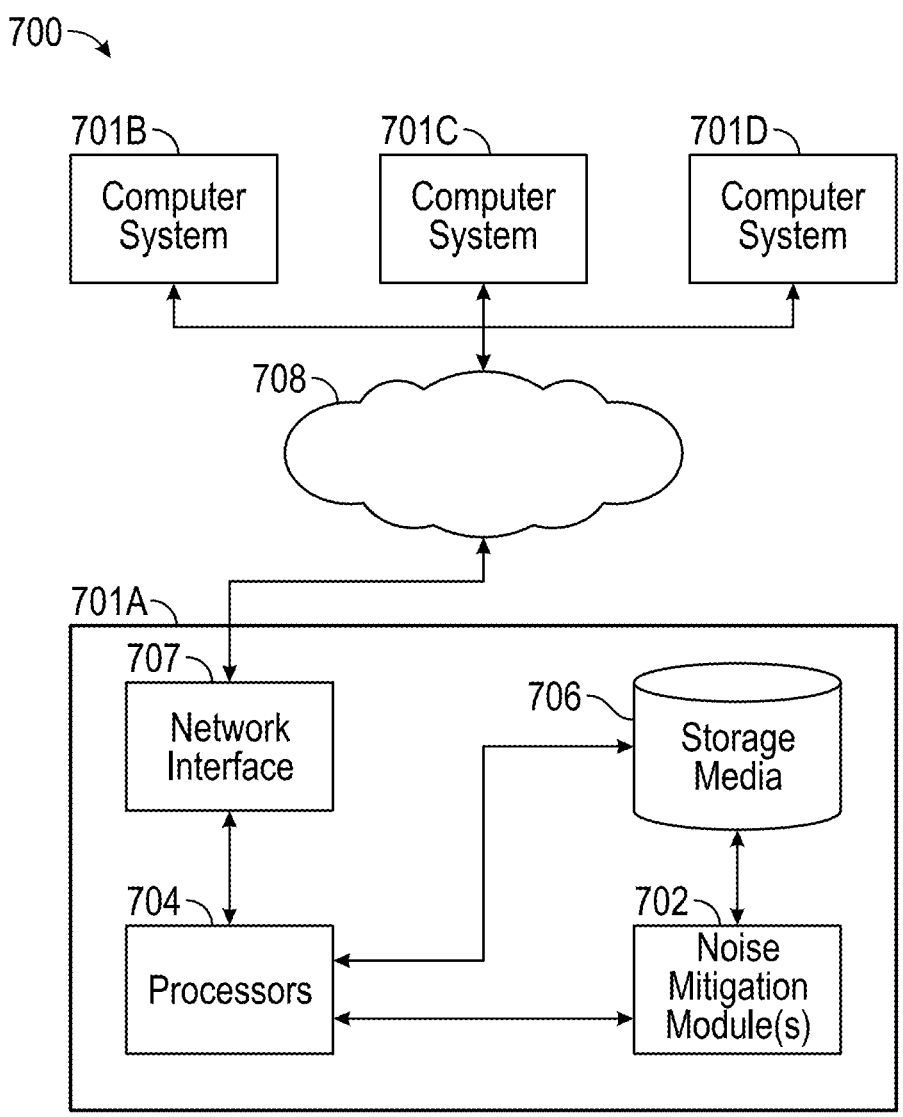
FIG. 7 illustrates a computing system in capable of incorporating with some embodiments of the present disclosure.

FIG. 7 illustrates an example computing system arrangement 700 in accordance with some embodiments. Computing system arrangement 700 may be an individual computer system or an arrangement of distributed computer systems. Computer system 701A includes one or more noise mitigation modules 702 that are configured to perform various tasks according to some embodiments, such as one or more methods disclosed herein. To perform these various tasks, noise mitigation module 702 executes independently, or in coordination with, one or more processors 704, which is (or are) connected to one or more storage media 706. The processor(s) 704 is (or are) also connected to a network interface 707 to allow the computer system 701A to communicate over a data network 708 with one or more additional computer systems and/or computing systems, such as 701B, 701C, and/or 701D (note that computer systems 701B, 701C and/or 701D may or may not share the same architecture as computer system 701A, and may be located in different physical locations, e.g., computer systems 701A and 701B may be in the field and/or on a laboratory, while in communication with one or more computer systems such as 701C and/or 701D that are located in one or more data centers, and/or located in varying countries on different continents and/or on various marine vehicles). Processors 704 may include a microprocessor, microcontroller, processor module or subsystem, programmable integrated circuit, programmable gate array, or another control or computing device.

The storage media 706 may be implemented as one or more computer-readable or machine-readable storage media. Note that while in the example embodiment of FIG. 7 storage media 706 is depicted as within computer system 701A, in some embodiments, storage media 706 may be distributed within and/or across multiple internal and/or external enclosures of computing system 701A and/or additional computing systems. Storage media 806 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BluRays, or other types of optical storage, or other types of storage devices. Note that the instructions discussed above may be provided on one computer-readable or machine-readable storage medium, or alternatively, may be provided on multiple computer-readable or machine-readable storage media distributed in a large system having possibly plural nodes. Such computer-readable or machine-readable storage medium or media is (are) considered to be part of an article (or article of manufacture). An article or article of manufacture may refer to any manufactured single component or multiple components. The storage medium or media may be located either in the machine running the machine-readable instructions, or located at a remote site from which machine-readable instructions may be downloaded over a network for execution.

It should be appreciated that computing system arrangement 700 is only one example of a computing system, and that computing system arrangement 700 may have more or fewer components than shown, may combine additional components not depicted in the example embodiment of FIG. 7, and/or computing system arrangement 700 may have a different configuration or arrangement of the components depicted in FIG. 7. The various components shown in FIG. 7 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of protection of the invention.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method for processing seismic data comprising the steps of:
    receiving data representing seismic energy gathered from a formation by a plurality of seismic receivers, wherein the data include primary and multiple data;
    creating a copy of the received data;
    compensating the copied data to reduce amplitude attenuation effects due to transmission and absorption losses;
    applying a multiple prediction algorithm to the received and compensated data to predict the multiple data;
    subtracting the predicted multiple data from the received data and obtain the primary data; and
    processing the primary data in the received data to reduce attenuation effects.

2. The method of claim 1, wherein processing the primary data also includes generating a model of attenuation factors for a subsurface region from the received data.

3. The method of claim 2, wherein the model of attenuation factors is generated at least in part from well data.

4. The method of claim 1, wherein the primary data is further compensated for attenuation after the processing step.

5. The method of claim 4, wherein an image of the subsurface is rendered after the further compensation.

6. The method of claim 1, wherein the primary data is compensated while an image of the subsurface is being rendered.

7. A system for processing data comprising:
a processor;
a computer memory comprising instructions executable by the processor to:
receive data representing seismic energy gathered from a formation, wherein the signals include primary and multiple data;
create a copy of the received data;
compensate the copied data to reduce attenuation effects;
apply a multiple prediction algorithm to the received and compensated data to identify the multiple data;
subtract the multiple data from the received data to identify the primary data; and
process the primary data to reduce attenuation effects.

8. The system of claim 7, wherein processing the primary data also includes generating models of attenuation factors for a subsurface region from the received data.

9. The system of claim 7, wherein the primary data is further compensated to reduce attenuation effects after the processing step.

10. The system of claim 9, wherein an image of the subsurface is rendered after the further compensation.

11. The system of claim 7, wherein the primary data is compensated while an image of the subsurface is being rendered.

12. A non-transitory computer-readable medium comprising instructions stored thereon, that when executed by a processor, performs the steps of:
receiving data representing seismic energy gathered from a formation from a plurality of seismic receivers, wherein the data include primary and multiple data;
creating a copy of the received data;
compensating the copied data to reduce amplitude attenuation effects due to transmission and absorption losses;
applying a multiple prediction algorithm to the received and compensated data to predict the multiple data;
subtracting the predicted multiple data from the received data and obtain the primary data; and
processing the primary data in the received data to reduce attenuation effects.

13. The non-transitory computer-readable medium of claim 12, wherein processing the primary data also includes generating a model of attenuation factors for a subsurface region from the received data.

14. The non-transitory computer-readable medium of claim 13 wherein the model of attenuation factors is generated at least in part from well data.

15. The non-transitory computer-readable medium of claim 12, wherein the primary data is further compensated for attenuation after the processing step.

16. The non-transitory computer-readable medium of claim 15, wherein an image of the subsurface is rendered after the further compensation.

17. The non-transitory computer-readable medium of claim 12, wherein the primary data is compensated while an image of the subsurface is being generated.

18. The system of claim 8, wherein the model of attenuation factors is generated at least in part from well data.

* * * * *